(12) United States Patent
Soyannwo et al.

(10) Patent No.: US 9,874,977 B1
(45) Date of Patent: Jan. 23, 2018

(54) GESTURE BASED VIRTUAL DEVICES

(75) Inventors: Olusanya T. Soyannwo, Cupertino, CA (US); Renwei Yan, Sunnyvale, CA (US); Edward Dietz Crump, Santa Cruz, CA (US); Sankara Narayana Hemanth Meenakshisundaram, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 13/568,835

(22) Filed: Aug. 7, 2012

(51) Int. Cl.
*G06K 9/00* (2006.01)
*G06F 3/042* (2006.01)
*G06F 3/044* (2006.01)

(52) U.S. Cl.
CPC .............. *G06F 3/042* (2013.01); *G06F 3/044* (2013.01)

(58) Field of Classification Search
CPC ................................. G06F 3/011; G06F 3/041
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2006/0284852 A1* | 12/2006 | Hofmeister | G06F 3/0483 345/173 |
| 2007/0041058 A1* | 2/2007 | Disatnik | G06F 3/0317 358/486 |
| 2008/0091605 A1* | 4/2008 | Hughes | G06F 21/31 705/51 |
| 2008/0168403 A1* | 7/2008 | Westerman | G06F 3/04883 715/863 |
| 2009/0153492 A1* | 6/2009 | Popp | G06F 3/04883 345/173 |
| 2010/0177039 A1* | 7/2010 | Grant | G06F 3/014 345/157 |
| 2010/0245260 A1* | 9/2010 | Louch | G06F 3/038 345/173 |
| 2011/0243380 A1* | 10/2011 | Forutanpour | G06F 3/017 382/103 |
| 2011/0296333 A1* | 12/2011 | Bateman | G06F 3/04883 715/773 |
| 2012/0127206 A1* | 5/2012 | Thompson | G06F 3/038 345/661 |
| 2012/0223885 A1 | 9/2012 | Perez | |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jennifer Mehmood
*Assistant Examiner* — Carl Adams
(74) *Attorney, Agent, or Firm* — Lee & Hayes, PLLC

(57) ABSTRACT

A sequence of 3D hand poses may be used to define a hand gesture, and different hand gestures may be represented by different sequences of poses. One or more hand gestures may be used to generate a virtual input device. Another one or more hand gestures may subsequently be used to provide input via the virtual input device.

29 Claims, 12 Drawing Sheets

GESTURE BASED VIRTUAL DEVICES

BACKGROUND

User interfaces have traditionally relied on physical input devices such as keyboards and mouse, which require physical manipulation by a user. Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
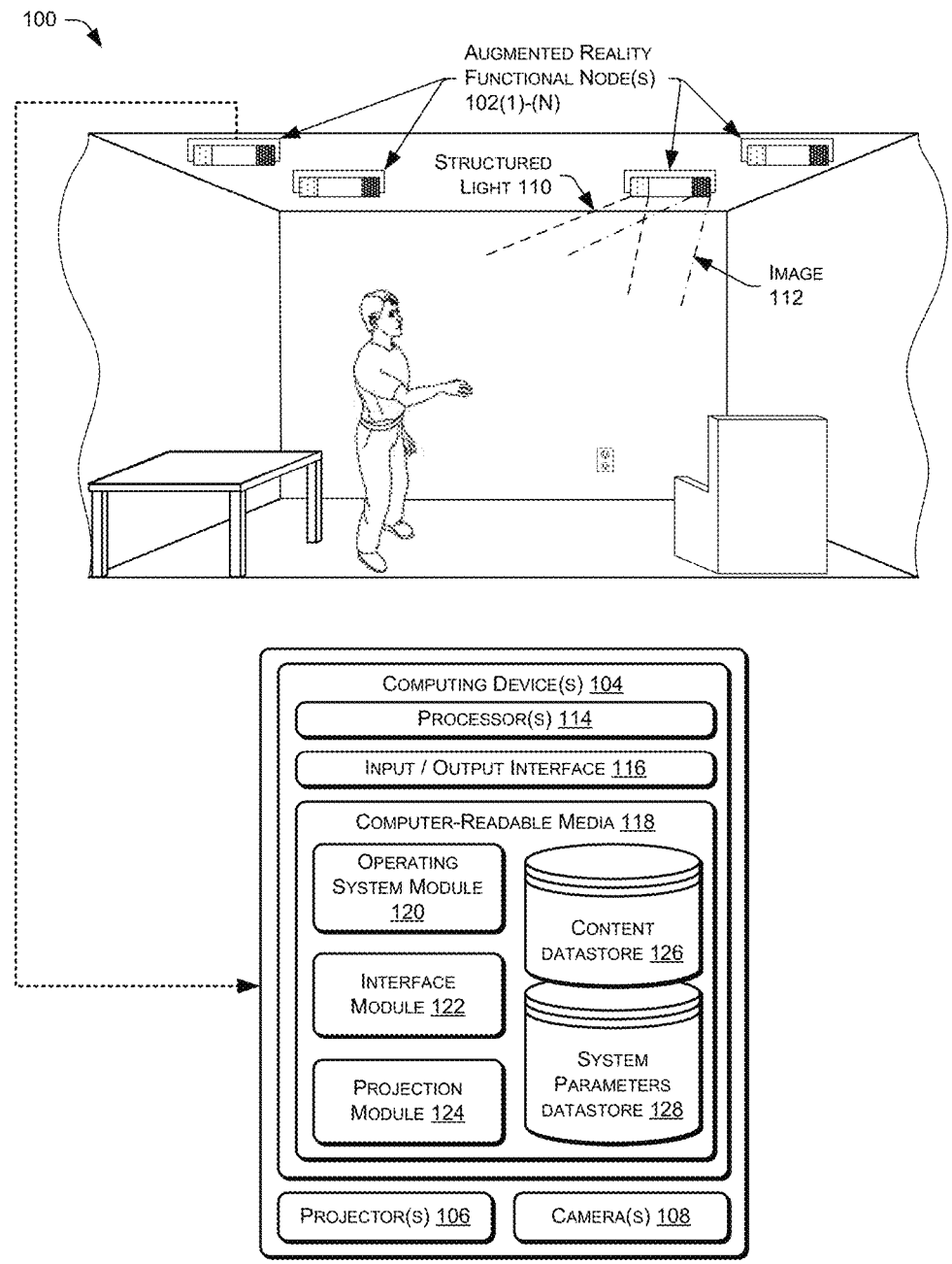
FIG. 1 illustrates an environment that includes an augmented reality functional node (ARFN) and a user that may interact with the ARFN using hand gestures.

Described herein are systems and techniques for generating and using virtual input devices through gestures of a person's hand within a scene. A hand motion or gesture may be represented by a dynamic motion model characterized by an accompanying set of motion parameters. Observed gestures may be evaluated against a library of reference gestures by comparing their motion parameters.

A hand motion or gesture may comprise a sequence of poses or pose vectors, where each pose vector indicates the position and orientation of the hand at a particular instance in time. The position and orientation may be specified in relative terms, such as by incremental measurements of the pose parameters with respect to previous poses in the sequence.

A plurality of reference gestures may be observed, and motion parameters may be estimated for each of the reference gestures. Subsequently, a user may be observed making a particular gesture. Motion parameters of the user gesture may be estimated, and compared with those of the library of reference gestures to identify or classify the user gesture.

Based on identifying a user gesture, a virtual input device may be generated. For example, based on identifying a user moving a predefined number of fingers, a virtual trackpad may be generated. The movement of the predefined number of fingers of the user may define a boundary of the virtual trackpad. Once the virtual trackpad is generated, the user may move a mouse cursor by appropriately moving another predefined number of fingers within the boundary of the virtual trackpad. The user may tap within the virtual trackpad to indicate a click a representation of a mouse button of the virtual trackpad. Thus, using gestures, the user may generate and interact with the virtual trackpad.

In addition to (or instead of) generating the virtual trackpad, the user may generate and interact with any other appropriate type of virtual input devices using hand gestures. For example, the user may, using hand gestures, generate and interact with a virtual slider bar, a virtual remote control, a virtual on/off switch, etc.

Using gestures, a user may also define a physical object as a virtual input device. For example, the user may identify the physical object using gestures (e.g., draw a circle around the physical object, tap the physical object, point towards the physical object, etc.), based on which the physical object may be defined to be, for example, a mouse. Subsequently, while the user moves the physical object, a mouse cursor may be correspondingly moved. The physical object may be an appropriate physical object, such as a paper weight, a pen, a bottle, etc.

Various types of cameras and sensors may be used to capture images representing the scene and a person's hand within the scene. In some instances, the described techniques may utilize the structured light techniques described below. Of course, other implementations may utilize any other type of depth-sensing and/or image recognition techniques.

Example Environment

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more cameras 108 that may capture images of the illustrated user operating the UI and, in response, the ARFN 102 may provide feedback to the user and/or may cause performance of actions corresponding to the user's selection. For instance, when the ARFN 102 projects a remote control, the ARFN 102 may provide feedback to the user indicating which button(s) a user is in position to select, may identify a user's selection (e.g., a selection to power on the television) and, in response, may operate the television according to identified selection. While a few examples have been given, it is to be appreciated that the ARFN 102 may project any other sort of content within the environment 100. In addition, the ARFN 102 may recognize and interpret gestures that are made by the user without reference to a UI projected within the environment. In addition, the ARFN 102 may recognize and interpret gestures that are made by the user, and based on the gestures, generate a UI (e.g., a virtual UI) projected within the environment.

In this example, one of the ARFNs 102 within the environment is shown to project structured light 110. In addition, the ARFN may capture one or more images 112 within the environment for the purpose of identifying distortions in the structured light 110. While FIG. 1 illustrates one ARFN projecting this structured light and imaging the environment to identify the distortions, in some implementations, one or more other ARFNs may additionally or alternatively perform these functions. In either instance, by imaging the environment in this manner, the ARFNs 102 may identify the user's gestures within the environment. Such gestures may be interpreted as instructions or commands to be implemented by the ARFNs 102.

As illustrated, the computing device 104 of the example ARFN 102 includes one or more processors 114, an input/output interface 116, and computer-readable media 118. The processors 114 may be configured to execute instructions, which may be stored in the computer-readable media 118 or in other computer-readable media accessible to the processors 114.

Figure 2:
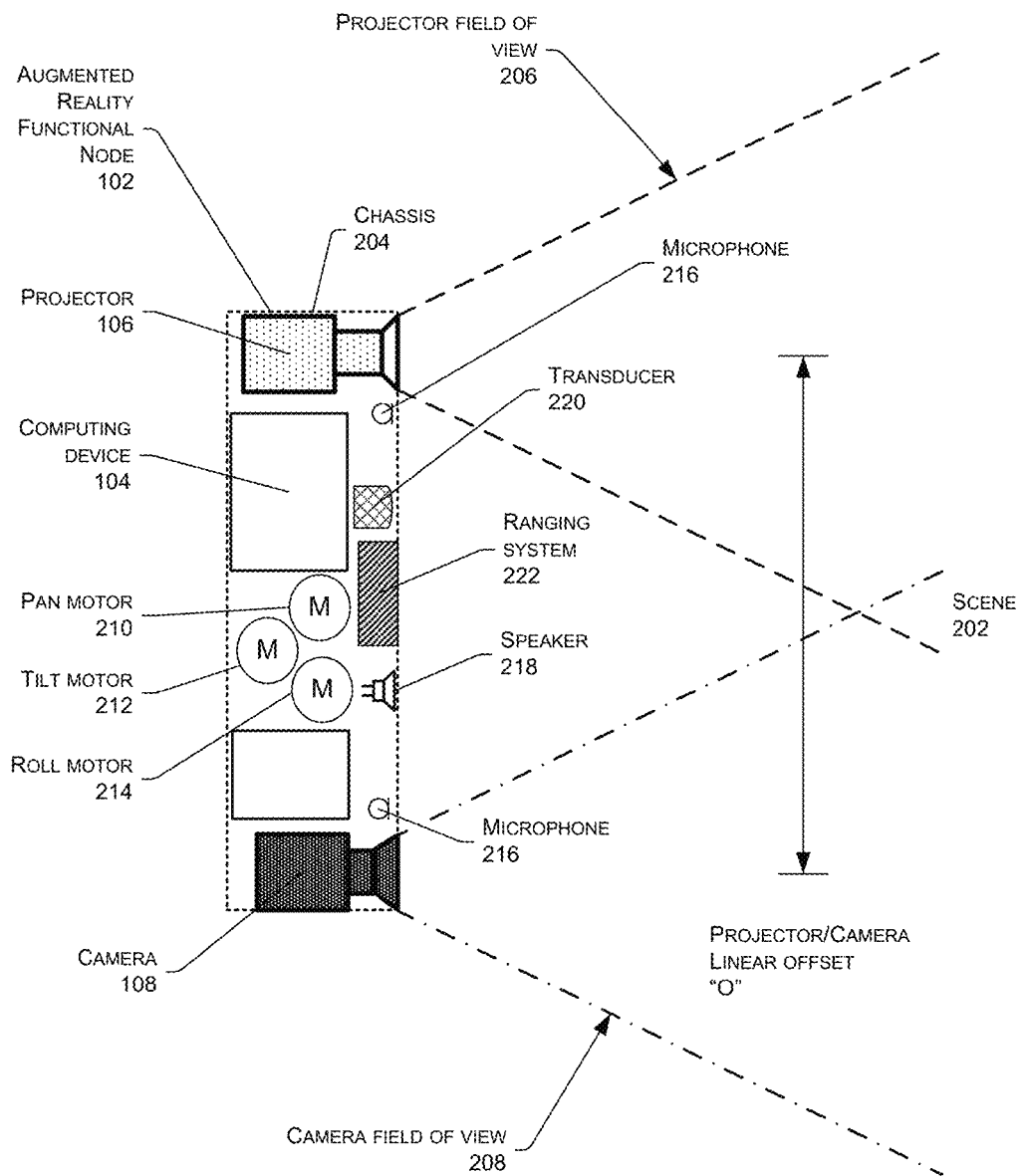
FIG. 2 illustrates an example ARFN that includes a computing device, a projector, a camera, and other selected components for allowing a user to interact with the ARFN with use of gestures interpreted by the ARFN.

The input/output interface 116, meanwhile, may be configured to couple the computing device 104 to other components of the ARFN 102, such as the projector 106, the camera 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106 or the camera 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse images captured by the camera 108 to identify hand gestures made by users within the environment 100. In response to identifying a predefined gesture, the interface module 122 may interpret the gesture and cause the ARFN 102 to perform a corresponding action.

For instance, if a user within the environment 100 makes a gesture requesting that the ARFN 102 project a certain piece of content, then the interface module 122 may interpret the gesture and cause the projection module 124 to project the content via the projector 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

Finally, the computer-readable media 118 may store the system parameters datastore 128, which is configured to maintain information about the state of the computing device 104, the projector 106, the camera 108, and so forth. For example, and as described in detail below, the ARFN 102 may be configured to pan and tilt for the purpose of allowing the projector 106 and the camera 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

Example ARFN

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector. For example, the projector field of view 206 may narrow upon application of an optical zoom to the projector.

One or more cameras 108 may also be disposed within the chassis 204. The camera 108 is configured to image the scene in visible light wavelengths, non-visible light wavelengths, or both. The camera 108 has a camera field of view 208 that describes a particular solid angle. The camera field of view 208 may vary according to changes in the configuration of the camera 108. For example, an optical zoom of the camera may narrow the camera field of view 208.

In some implementations, a plurality of cameras 108 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 222. The ranging system 222 is configured to provide distance information from the ARFN 102 to a scanned object or a set of objects. The ranging system 222 may comprise radar, light detection and ranging (LIDAR), ultrasonic ranging, stereoscopic ranging, and so forth. In some implementations the transducer 220, the microphones 216, the speaker 218, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 108. Placement of the projector 106 and the camera 108 at a distance "O" from one another may aid in the recovery of 3D structured light data from the scene. The known projector/camera linear offset "O" may also be used to calculate distances, dimensioning, and otherwise aid in the characterization of objects within the scene 202. In other implementations the relative angle and size of the projector field of view 206 and camera field of view 208 may vary. Also, the angle of the projector 106 and the camera 108 relative to the chassis 204 may vary.

In other implementations, the components of the ARFN 102 may be distributed in one or more locations within the environment 100. As mentioned above, microphones 216 and speakers 218 may be distributed throughout the scene. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

3D Analysis Using Structured Light Pattern

Figure 3:
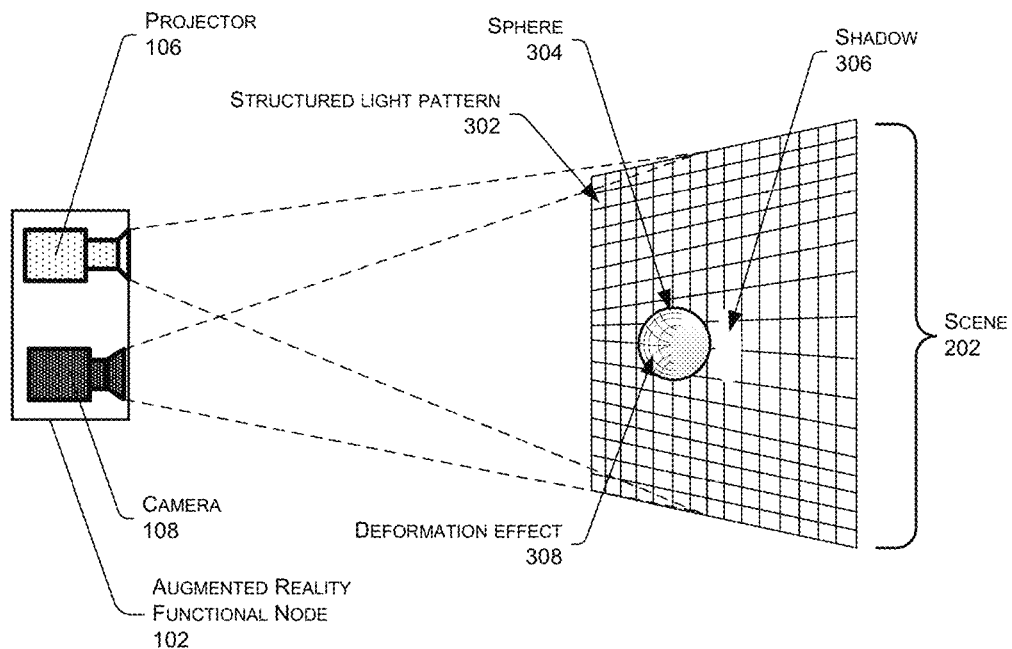
FIG. 3 is an illustrative diagram of the ARFN using structured light to identify surfaces, objects, and user interactions within an environment. By identifying user interactions, the ARFN is able to determine when a user is requesting that the ARFN perform a specified action.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 108 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene. Where the projector 106 and camera 108 have differing fields of view, such as shown in FIG. 2, the dispersion or change in the "density" of the structured light pattern 302 may be used to determine depth of field.

The camera 108 detects the interaction of the structured light pattern 302 with objects within the scene. For example, the deformation effect 308 on the sphere 304 is detected by the camera 108. The camera may similarly identify deformation effects on users within the environment and may utilize this information to identify user gestures and how trajectories of these gestures. That is, the camera 108 may identify, via deformation in the structured light, a location of a selection tool (e.g., a user's finger) as this location changes over time. The ARFN 102 may then use these locations tracked over time to identify a trajectory of the gesture.

Detecting Hand Poses

Figure 4:
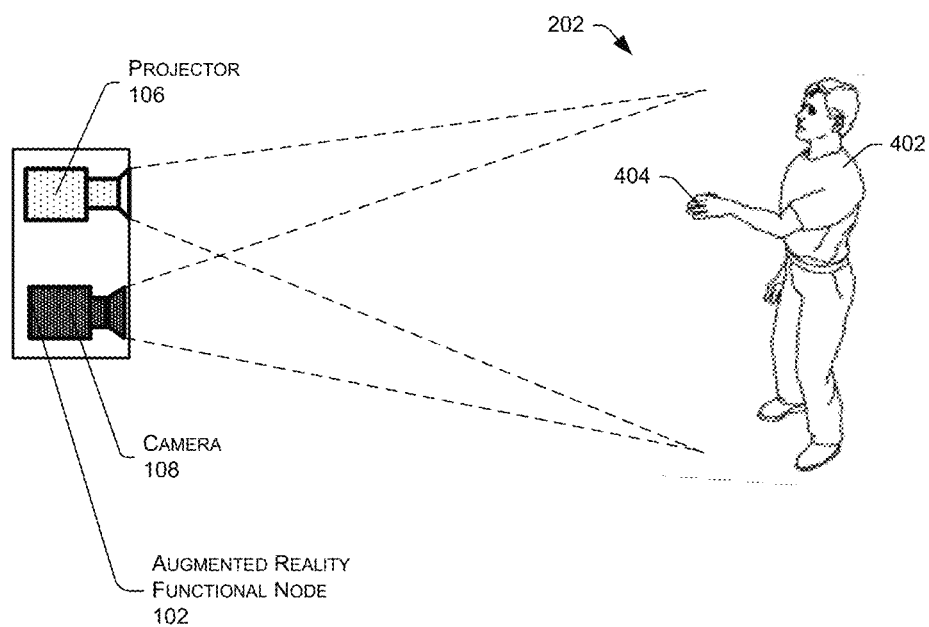
FIG. 4 is an illustrative diagram of the ARFN detecting the pose of a hand within an environment.

FIG. 4 illustrates an example of how the ARFN 102 may be used to observe and identify hand gestures within the scene 202. FIG. 4 shows a person 402 and the person's hand 404 as examples of objects within the environment 100 that may be analyzed by the ARFN 102.

In order to identify hand gestures, the ARFN 102 detects and tracks the hand 404 within the environment or scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations.

As an example, 3D position coordinates may be specified relative to orthogonal X, Y, and Z axes. 3D angular orientations may be specified as rotations about the X, Y, and Z axes.

As described above, the camera 108 may be used in conjunction with a structured light pattern projected by the projector 106 to capture 3D information regarding objects within the scene 202. Specifically, the projector 106 may project a structured light pattern onto the scene 202, and the camera 108 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 108 of the ARFN 102 may be used to capture 2D images of the scene 202. For example, the camera 108 may be used in conjunction with ambient lighting, with or without further illumination by the projector 106, to capture a 2D image of the environment 100. The captured 2D image may be a color or greyscale image, comprising an array of pixels defined by tone or color intensities.

As described above, the projector 106 may be configured to project non-visible light, or light of a specific wavelength that can be filtered by the camera 108 or by electronics associated with the camera 108. This may allow the ARFN 102 to obtain, from a single image capture, a 2D color image of the scene 202 and a 2D pattern image of the projected light pattern as reflected by any objects within the scene 202, such as the person 402 and/or the person's hand 404.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Figure 5:
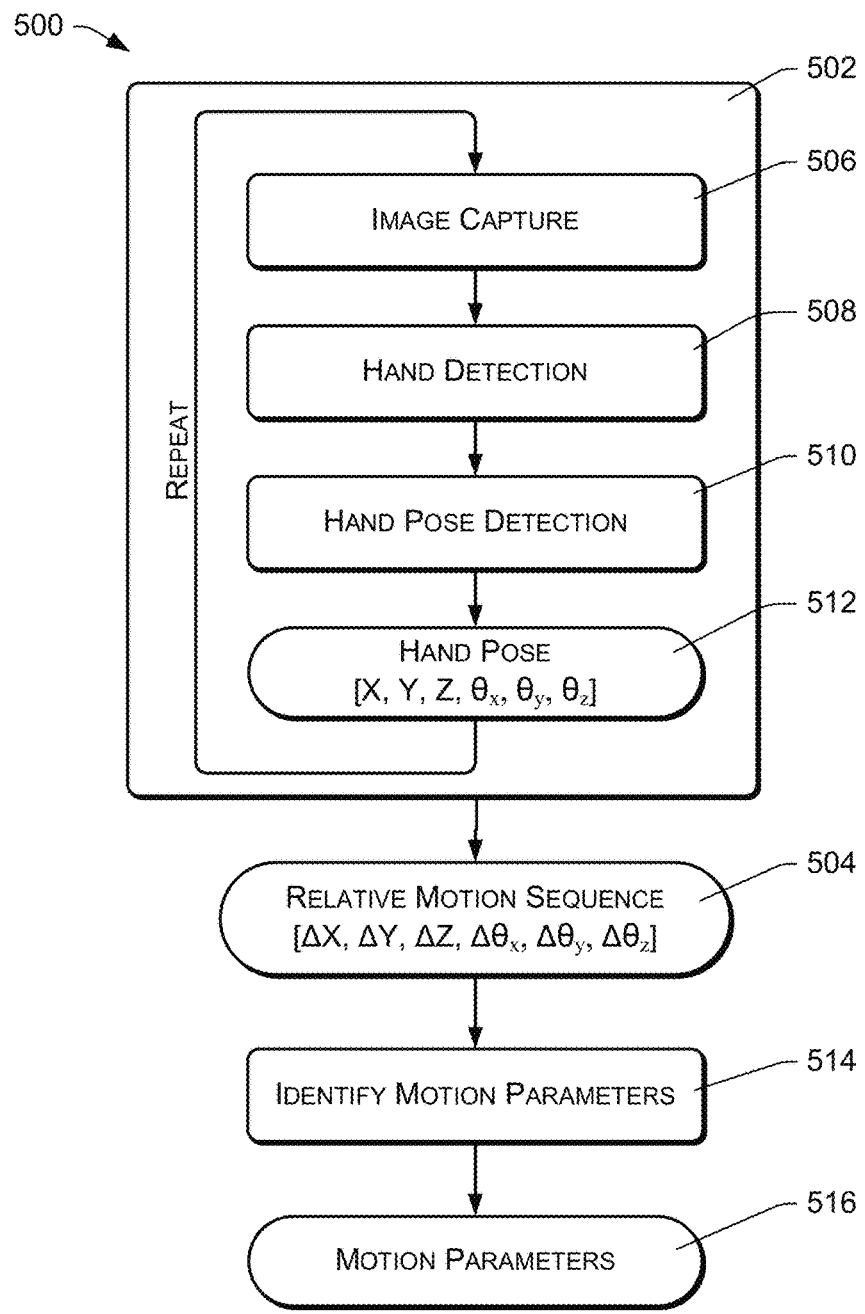
FIG. 5 illustrates an example flow diagram of an ARFN analyzing or monitoring a scene or environment to identify a motion sequence corresponding to a hand gesture made by the user within the scene or environment.

FIG. 5 illustrates an example method 500 of calculating or identifying motion parameters corresponding to a motion or gesture of the hand 404 or other object within the scene 202. The method 500 will be described as being performed in the environment described above with reference to FIGS. 1-4. However, the method 500 may be performed in other environments, using other means of image capture and/or scene analysis.

An action 502 comprises calculating or identifying the pose of the hand 404 within the scene 202 and generating a relative motion sequence 504. The actions within action 502 are performed repetitively, with respect to subsequent images or frames corresponding to successive instances in time. Generally, the action 502 comprises capturing a sequence of images showing a gesture made by a hand of a user and determining sequential poses of the hand based on the images.

Each repetition of the action 502 may more specifically comprise an action 506 of capturing one or more images of the scene 202, including those parts or regions of the scene 202 that may contain the hand 404. In the described embodiment, the one or more images may be 2D images captured by the camera 108. The one or more images may also include other data objects, such as images containing 3D information corresponding to the scene 202. For example, certain captured images may show a reflected light pattern, based on a structured light pattern that is projected by the projector 106. 3D information or characteristics regarding the scene may be obtained by analyzing the reflected light pattern.

Alternatively, or in addition, the captured images may include images of the scene 202 taken from different perspectives, which may be analyzed in comparison to each other to reconstruct 3D characteristics of the scene 202.

An action 508 may comprise detecting the presence and/or location the hand 404 within the scene 202, based on the one or more captured images resulting from the action 506. For example, various types of shape analysis, including 2D and/or 3D techniques, may be performed to identify the position of the hand 404 within the scene 202.

An action 510 may comprise detecting or calculating the hand pose 512 of the hand 404 relative to the scene 202. The hand pose 512 may be specified in terms of position and orientation in three dimensions. Position may be specified by linear measurements with respect to orthogonal 3D axes such as X, Y, and Z. Orientation may be specified by angular measurements around the 3D axes, such as by the angles $\theta_x$, $\theta_y$, and $\theta_z$, corresponding to angular measurements with respect to the X, Y, and Z axes, respectively. Thus, an individual hand pose may be indicated or specified by the vector [X, Y, Z, $\theta_x$, $\theta_y$, $\theta_z$].

The relative motion sequence 504 may be calculated as differences between successive hand poses. For example, the relative motion sequence 504 may comprise a stream or sequence of relative motion vectors [$\Delta X$, $\Delta Y$, $\Delta Z$, $\Delta\theta_x$, $\Delta\theta_y$, $\Delta\theta_z$], where each parameter indicates the difference ($\Delta$) from the corresponding parameter of the previous vector.

Based on the relative motion sequence 504, an action 514 may comprise identifying a mathematical motion function and a corresponding set of function parameters 516 that describe the user gesture and corresponding relative motion sequence 504.

The motion of the user's hand can be described as a continuous-time movement. Such continuous movement can be characterized by continuous-time system dynamics, and can be described by a dynamic motion model comprising a set of state equations.

A dynamic motion model can be associated with a matrix or set of parameters, referred to herein as motion parameters, in order to model or describe a particular gesture. In the described embodiment, the action 514 estimates motion parameters 516 that minimize differences between the output of a dynamic motion model and the observed motion vectors of the motion sequence 504. Specifically, such motion parameters 516 may be estimated using recursive least squares (RLS) parameter identification.

Appropriate motion modeling and parameter estimation techniques using RLS are discussed in "Rigid Object Motion Parameter Estimation from a Dynamic Image Sequence", Ph.D. dissertation by S. Chang, George Mason University, Fairfax, Va., 1997. Other known methods of motion modeling and motion parameter estimation may also be used.

The parameter set 514 may be applied to a motion function or set of state equations, as defined by the dynamic motion model, to define or describe the 3D motion of any particular gesture. Therefore, the motion parameters 514 can be thought of as representing such a user gesture.

Figure 6:
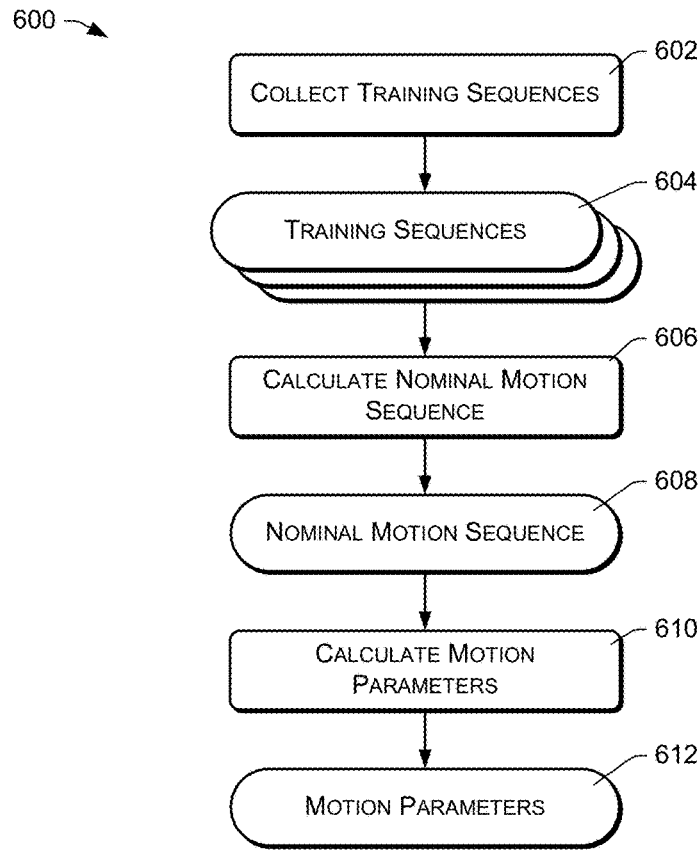
FIG. 6 illustrates an example flow diagram of an ARFN creating reference sequences based on gestures made by a user during training.

FIG. 6 illustrates an example method 600 of calculating or generating a training-based reference sequence for use in classifying observed user gestures. The method 600 may be performed with respect to multiple gesture types or classifications to generate a library of motion parameters corresponding to multiple reference gestures, against which observed gestures may be compared.

An action 602 comprises observing and/or collecting multiple training motion or pose sequences 604, corresponding to multiple observations of one or more users performing the same gesture or gesture type. Each training sequence 604 may comprise a relative motion sequence 504, which has been generated as described above with reference to FIG. 5.

An action 606 may comprise processing the multiple training sequences 604 to calculate and/or create a nominal motion sequence 608. For example, the training sequences 604 may be averaged or subjected to other statistical analysis to create a series of X=[$\Delta X$, $\Delta Y$, $\Delta Z$, $\Delta\theta_x$, $\Delta\theta_y$, $\Delta\theta_z$] vectors representing the nominal motion sequence 608.

An action 610 may comprise calculating motion parameters 612 based on the nominal motion sequence. This may be performed by the dynamic motion modeling and estimation techniques described above with reference to FIG. 5.

The motion parameters 612, when applied to a dynamic motion model, represent the nominal motion stream. The method of FIG. 6 may be performed with respect to various different types or classifications of gestures, to create and store a library of motion parameters or motion parameter sets 612 for comparison with motion parameters 516 of observed gestures, as will be described in more detail below with reference to FIG. 7.

Figure 7:
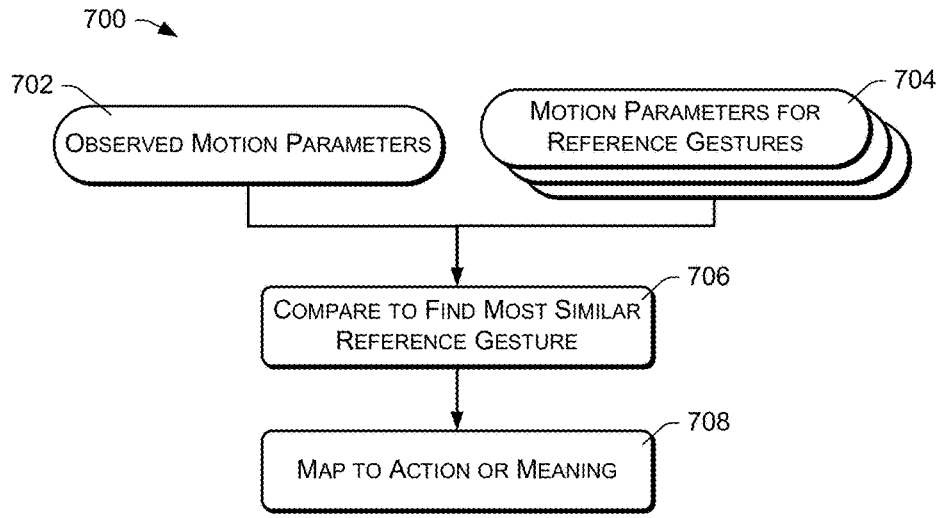
FIG. 7 illustrates an example flow diagram of an ARFN evaluating and taking action in response to a user gesture.

FIG. 7 illustrates an example method 700 of evaluating and acting upon user gestures. The method 700 receives as input motion parameters corresponding to an observed user gesture, and multiple sets of motion parameters 704 corresponding respectively to different reference gestures. The motion parameters 702 of the observed gesture may be obtained by the example method 500 of FIG. 5. The motion parameters 704 of the reference gestures may be compiled or creating by using the method 600 of FIG. 6.

An action 706 comprises comparing the motion parameters 702 of the observed motion with the motion parameters 704 of the reference gestures to find a reference gesture whose motion parameters 704 most closely correspond to the motion parameters 702 of the observed gesture. If M is defined as the number of collection of reference gestures represented by motion parameters 702 and N is defined as the number of parameters of a motion model, then any motion model is a point in an N-dimension space. For a given gesture, assume that the distribution of M in N-dimensional space is Gaussian, then a region representing the given gesture in the N-dimensional space can be defined. An observed motion is detected as a pattern of the given gesture if the N-dimensional point represented the motion falls into the region.

Upon finding a substantially matching gesture, an action 708 may comprise classifying the observed user gesture by mapping an action or meaning to the observed user gesture. For example, the system may be preconfigured to associate respective actions or meanings to each of the referenced gestures. Upon detecting or observing a user gesture corresponding to a particular one of the reference gestures, the system may perform the associated action or interpret the gesture has having the meaning associated with the reference gesture 704.

Generating Virtual Input Device Using Gestures

In some implementations, user gestures may be used to generate one or more virtual input devices within the scene 202. Such virtual input devices may be used (e.g., by the person 402) as a UI (e.g., a virtual UI), such as a virtual trackpad, a virtual mouse, a virtual keyboard, a virtual slider bar, a virtual remote control to operate a television within the environment 100, or any other type of UI.

For example, referring again to FIG. 3, the projector 106 may project content onto the scene 202, where the content may include, for example, electronic books, videos, images, interactive menus, or any other sort of visual content. The person 402 may desire to move a mouse cursor over the scene 202. To control the mouse cursor over the scene 202, for example, the person 402 may use a physical mouse device. Additionally or alternatively, the person 402 may use a virtual trackpad to navigate the mouse cursor over the scene 202. In some implementations, the person 402 may use gestures to generate or otherwise define the virtual trackpad for navigating the mouse cursor over the scene 202.

Figure 8A:
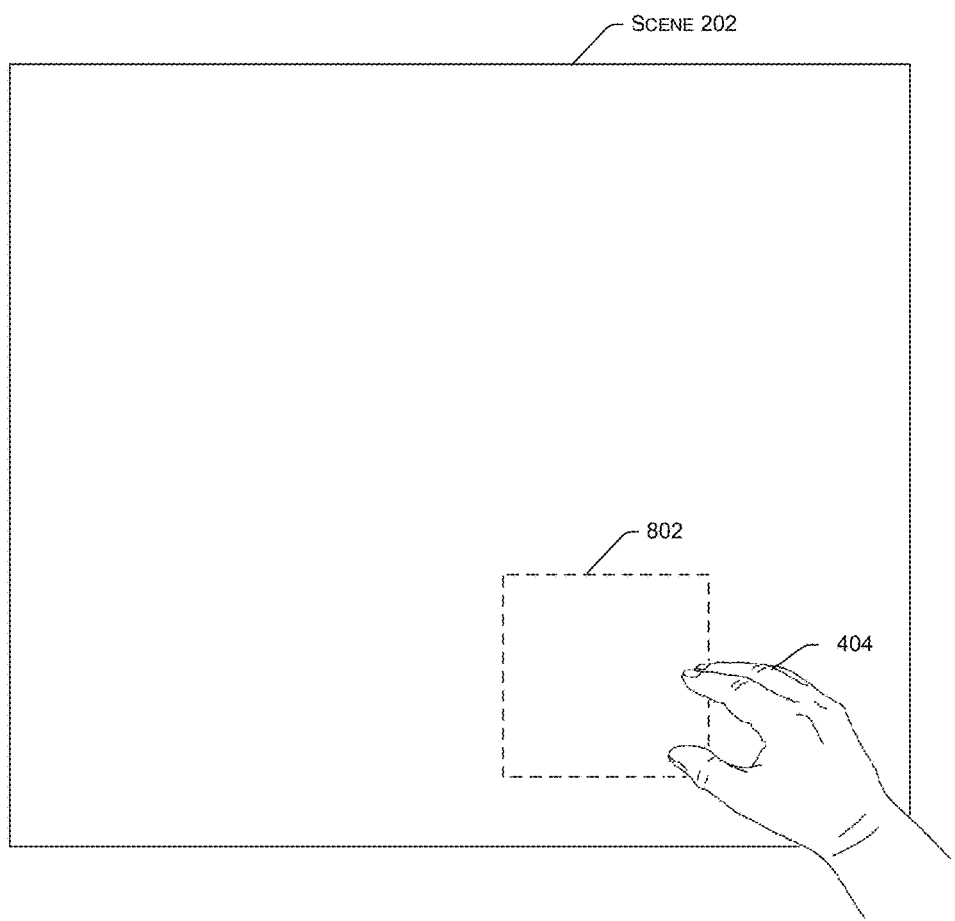
FIGS. 8A and 8B illustrate generation of an example virtual input device within a scene using hand gestures.

FIG. 8A illustrates generation of a virtual trackpad 802 within the scene 202 using gestures. When the person 402 desires to generate the virtual trackpad, a predefined gesture may be used by the person 402 to indicate a request to generate the virtual trackpad to the ARFN 102. Such a pre-defined gesture may comprise, for example, waving the hand 404 in a specific manner, a voice gesture (e.g., saying loudly "generate a trackpad"), or the like. Alternatively, the person may use an existing UI (e.g., a virtual or physical keyboard) to communicate to the ARFN 102 the request to generate the virtual trackpad.

The interface module 122 in the ARFN 102 (or an appropriate system coupled to the ARFN 102) may identify the pre-defined gesture, acknowledge the gesture, and request the person 402 to define a boundary of the virtual trackpad. For example, the ARFN 102 may verbally announce the request to define the boundary of the virtual trackpad (e.g., verbally announce that "Please define the virtual trackpad boundary"). Additionally or alternatively, the ARFN 102 may project a message onto the scene, the message indicating the request to define the trackpad boundary. Subsequently, the person 402 may define a virtual trackpad 802 on the scene 202 using hand gestures, e.g., as illustrated in FIG. 8A. For example, the person 402 may move two fingers of the hand 404 in a rectangular shape, such that the rectangular shape defines the boundary of the virtual trackpad 802 (illustrated using dotted lines in FIG. 8A). The interface module 122 may interpret the movement of the two fingers and cause the ARFN 102 to generate the virtual trackpad 802.

In some other implementations, the person 402 may bypass the above discussed pre-defined gesture to express a request to generate the virtual trackpad, and the ARFN 102 may bypass (i) the acknowledgement of such a request and (ii) the request to define the virtual trackpad. In such implementations, the person 402 may directly define the virtual trackpad 802 using pre-defined gestures, e.g., by moving the two fingers of the hand 404 in the rectangular shape to define the boundary of the virtual trackpad 802.

Figure 8B:
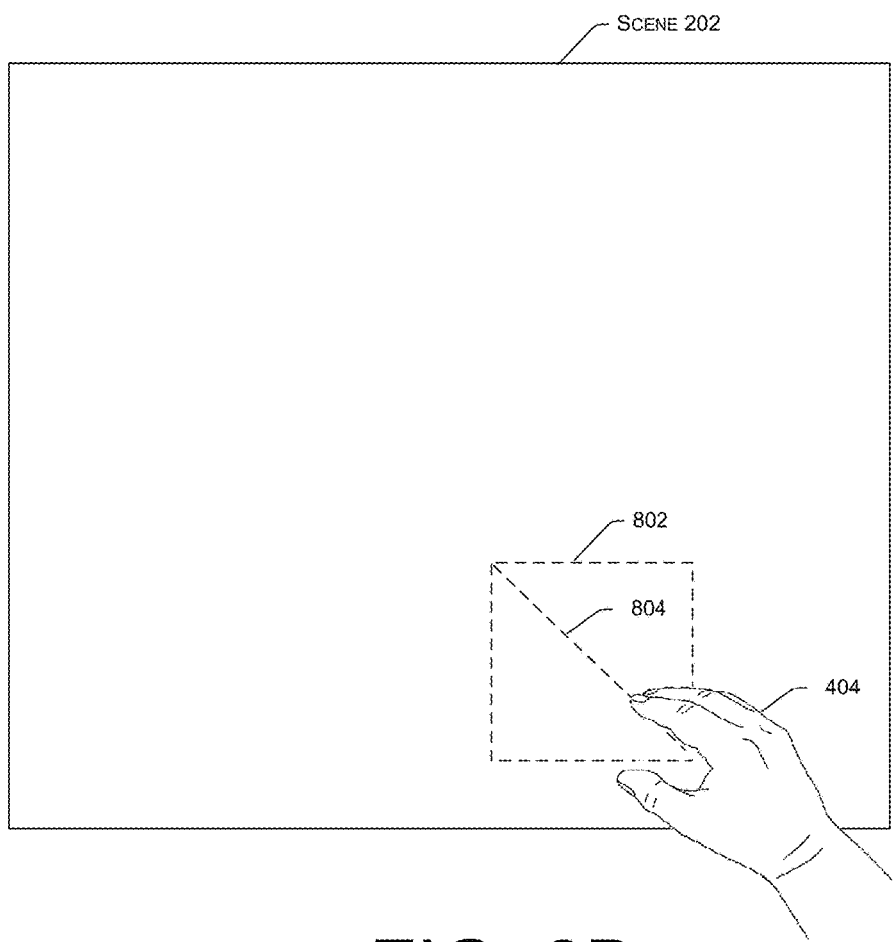

Although FIG. 8A illustrates the person 402 defining the virtual trackpad 802 by moving fingers in a rectangular shape, in some other implementations, the virtual trackpad 802 may be generated in any other appropriate manner. For example, as illustrated in FIG. 8B, the person 402 may, using predefined gestures, define a line 804 (e.g., by moving the two fingers of the hand 404 over the line 804). Based on the ARFN 102 detecting the line 804, the ARFN 102 may generate the virtual trackpad 802 such that the virtual trackpad 802 is rectangular in shape, and a diagonal of the virtual trackpad 802 coincides with the line 804 defined by the person 402.

Although FIGS. 8A and 8B illustrate a rectangular shape of the virtual trackpad 802, the virtual trackpad 802 may be of any appropriate shape, based on the movement of the user's hand while defining the boundary of the virtual trackpad 802.

Once the virtual trackpad 802 is defined by the person 402 using hand gestures, the ARFN 102 (or an appropriate system coupled to the ARFN 102) may acknowledge the generation of the virtual trackpad 802. Such acknowledge may be, for example, in the form of a verbal announcement, a pre-defined sound, and/or a message projected onto the scene 202.

In some implementations, once the person 402 defines the virtual trackpad 802, the projector 106 may project lines onto the scene 202, such that the projected lines overlap the boundary of the virtual trackpad 802. That is, the boundary of the virtual trackpad 802 (or the area covered by the virtual trackpad 802) may be illuminated, or otherwise marked, using the projector 106. Marking the virtual trackpad 802 may enable the person 402 to readily identify and use the virtual trackpad 802.

In some implementations, once the virtual trackpad 802 is defined by the person 402, one or more menus associated with the virtual trackpad 802 may also be projected onto the scene 202. For example, a configuration menu may provide various options and configuration parameters associated with the virtual trackpad 802. Options and configuration parameters included in the configuration menu may be, for example, similar to those associated with a physical trackpad and/or a physical pointing device, such as a mouse. The person 402 may configure the virtual trackpad 802 using predefined gestures. For example, using predefined gestures, the person 402 may navigate through the configuration menu and select various menu items to configure the virtual trackpad 802.

Figure 9A:
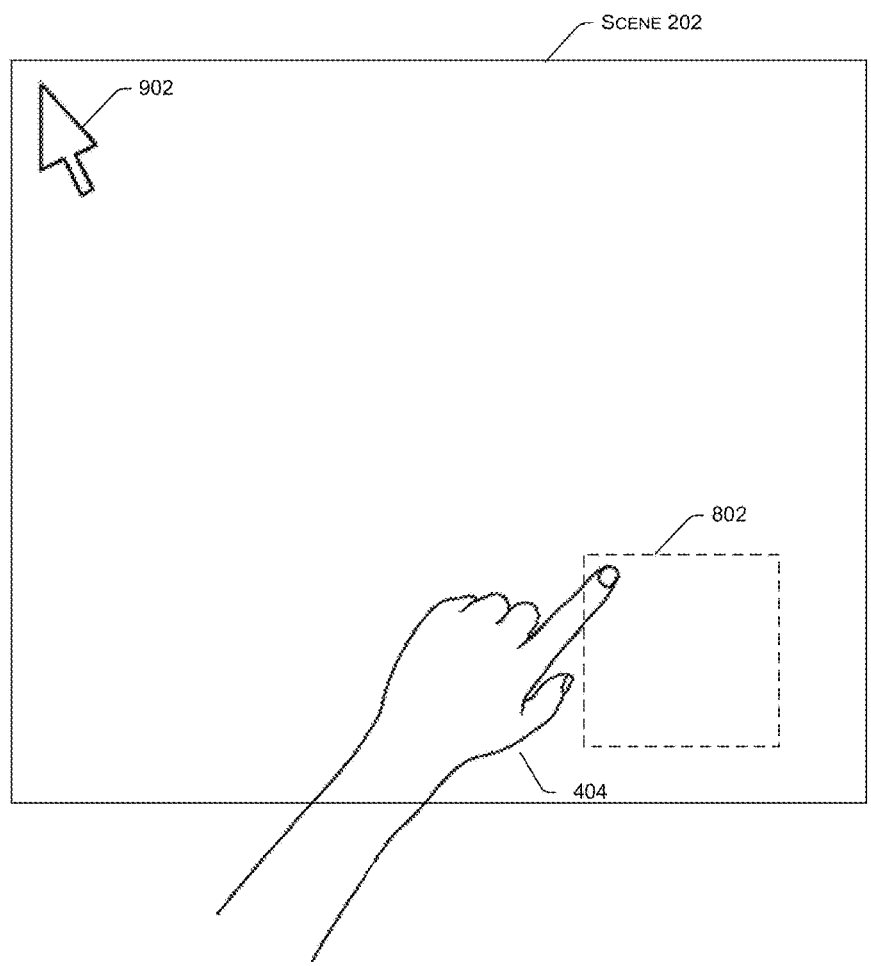
FIGS. 9A and 9B illustrate example usage of a virtual input device through hand gestures.
Figure 9B:
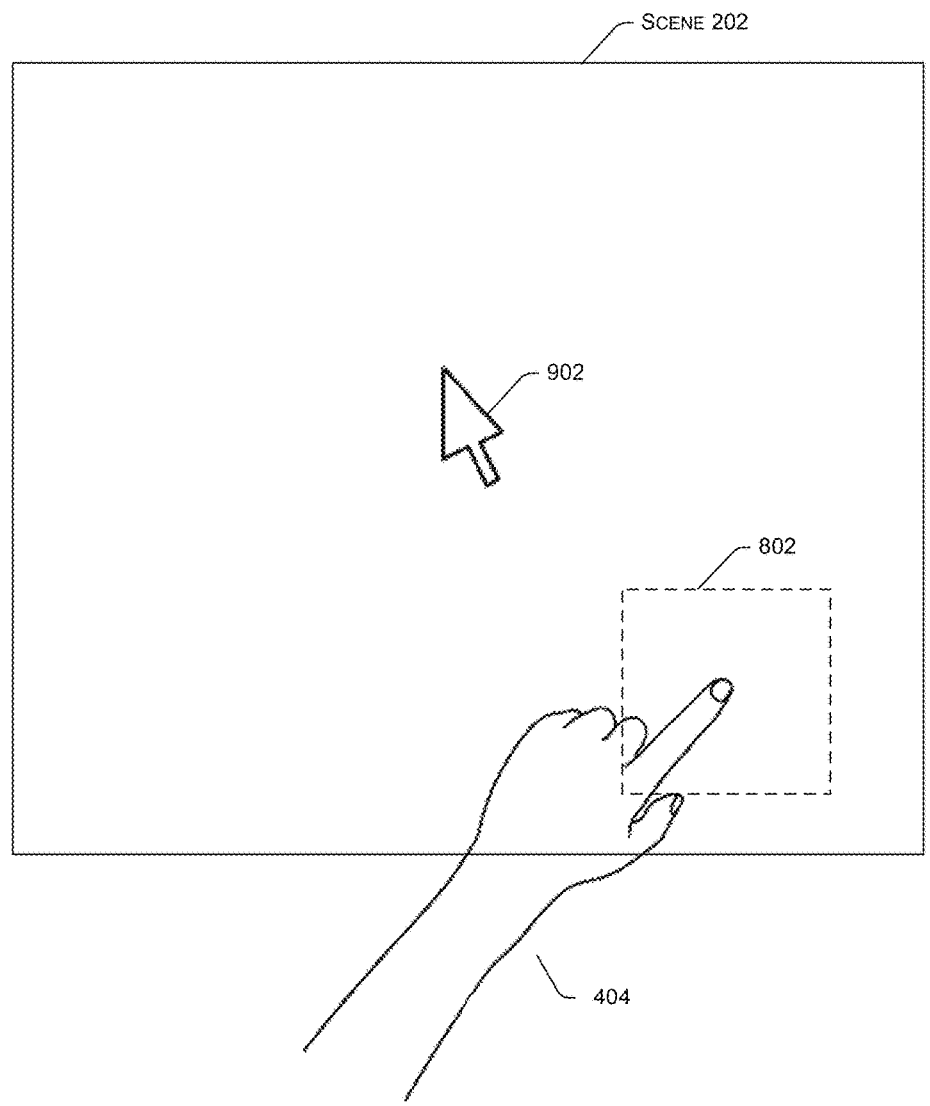

The person 402 may use the virtual trackpad 802 through appropriate gestures to control a mouse cursor. The gestures to use the virtual trackpad 802 may be, for example, different from the gesture to initially define the virtual trackpad 802. For example, the person 402 may use two fingers of the hand 404 to define the boundary of the virtual trackpad 802, and use a single finger to interact with (i.e., use) the virtual trackpad 802. For example, the person 402 may move the single finger of the hand 404 within the virtual trackpad 802, based on which the ARFN 102 may correspondingly move a mouse cursor 902 onto the scene 202, as illustrated in FIGS. 9A and 9B.

Although FIGS. 8A, 8B, 9A and 9B illustrate the virtual trackpad 802 being defined within the display area of the scene 202, in some other implementations, the virtual trackpad 802 may be defined outside the display area of the scene 202 as well. For example, the virtual trackpad 802 may be defined in an area in which the projector 106 does not project content, but from which the camera 108 captures images. Accordingly, in such implementations, the virtual trackpad 802 may not obstruct the projected content.

Figure 10:
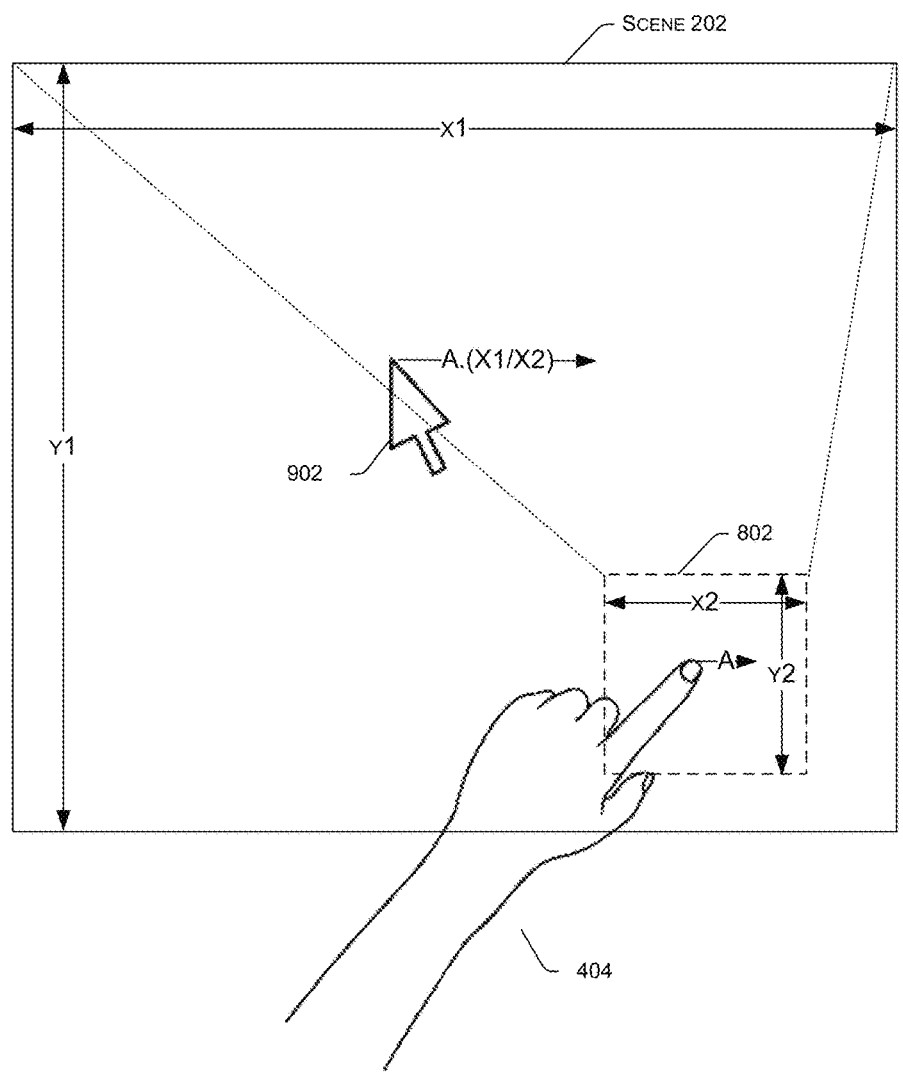
FIG. 10 illustrates mapping of a virtual trackpad to a scene.

Subsequent to defining the virtual trackpad 802, the ARFN 102 (or an appropriate system coupled to the ARFN 102) may map the virtual trackpad 802 to the scene 202. For example, as illustrated in FIG. 10, in an implementation, the scene 202 may be a rectangle with a dimension of X1 by Y1, and the virtual trackpad 802 may be defined to have a dimension of X2 by Y2. The ARFN 102 may associate the virtual trackpad 802 by linearly mapping the virtual trackpad 802 to the scene 202 such that, for example, a horizontal movement of A units of the finger in the virtual trackpad 802 results in a horizontal movement of (A·(X1/X2)) units of the mouse courser 902 on the scene 202. That is, a movement of the finger inside the virtual trackpad 802 may be mapped linearly into the movement of the mouse courser 902 on the scene 202. For example, as illustrated in FIG. 10, the top horizontal boundary of the virtual trackpad 802 may be mapped linearly into the top horizontal boundary of the scene 202.

In some other implementations, the movement of the finger inside the virtual trackpad 802 may be mapped non-linearly into the movement of the mouse courser 902 on the scene 202 (e.g., the mapping may be based on a speed of the movement of the finger inside the virtual trackpad 802).

Each corner of the virtual trackpad 802 may be mapped to a corresponding corner in the scene 202. For example, as illustrated in FIG. 9A, when the person 402, using the single finger, points to the top-left corner of the virtual trackpad 802, the mouse cursor 902 is correspondingly moved to the top-left corner of the scene 202. In another example, as illustrated in FIG. 9B, when the person 402, using the single finger, points to the center of the virtual trackpad 802, the mouse cursor 902 is correspondingly moved to the center of the scene 202.

In addition to moving the mouse cursor 902, in an example, the virtual trackpad 802 may also be used to facilitate a clicking a representation a button of the virtual trackpad 802. For example, the person 402 may tap on the virtual trackpad 802. The interface module 122 may identify this hand gesture, and may translate this hand gesture to a clicking of representation the button of the virtual trackpad 802 (e.g., a left mouse button or a right mouse button of the virtual trackpad 802). For example, the person 402 may move the mouse cursor 902 (e.g., by appropriately moving the finger of the hand 404 over the virtual trackpad 802) over to an image of an object projected onto the scene 202. The person 402 may then tap (e.g., mimic a clicking of a mouse button) onto the virtual trackpad 802, which may result in the mouse cursor 902 selecting the object.

Other functions of a typical physical trackpad and/or a physical mouse may also be performed by the virtual trackpad 802. For example, via appropriate hand gestures (e.g., in addition to appropriate voice commands), the person 402 may use the virtual trackpad 802 to select one or more objects projected onto the scene 202, perform a right click and/or a left click operation, open a display menu (e.g., by performing a right click operation), select an item from the display menu (e.g., by moving the mouse cursor 902 and performing a left click operation), scroll on the scene 202, drag and drop, define and use a representation of a mouse wheel of the virtual trackpad 802, and/or the like. For example, tapping using one finger of the hand 404 in the virtual trackpad 802 may be interpreted as clicking the left button of a mouse, tapping using two fingers of the hand 404 in the virtual trackpad 802 may be interpreted as clicking the right button of the mouse, rotating the hand 404 may be interpreted as selecting an object, moving a finger after a predefined gesture (or moving the finger along a right boundary of the virtual trackpad 802) may be interpreted as scrolling a mouse wheel of the virtual trackpad 802, etc.

In an example, the virtual trackpad 802 may also be used to drag the scene 202 to a different position, change an orientation of the scene 202, and/or the like. For example, using appropriate hand gestures (e.g., in addition to appropriate voice commands) within the boundary of the virtual trackpad 802, the person 402 may facilitate dragging the scene 202, rotating the scene 202, and/or the like.

Figure 11:
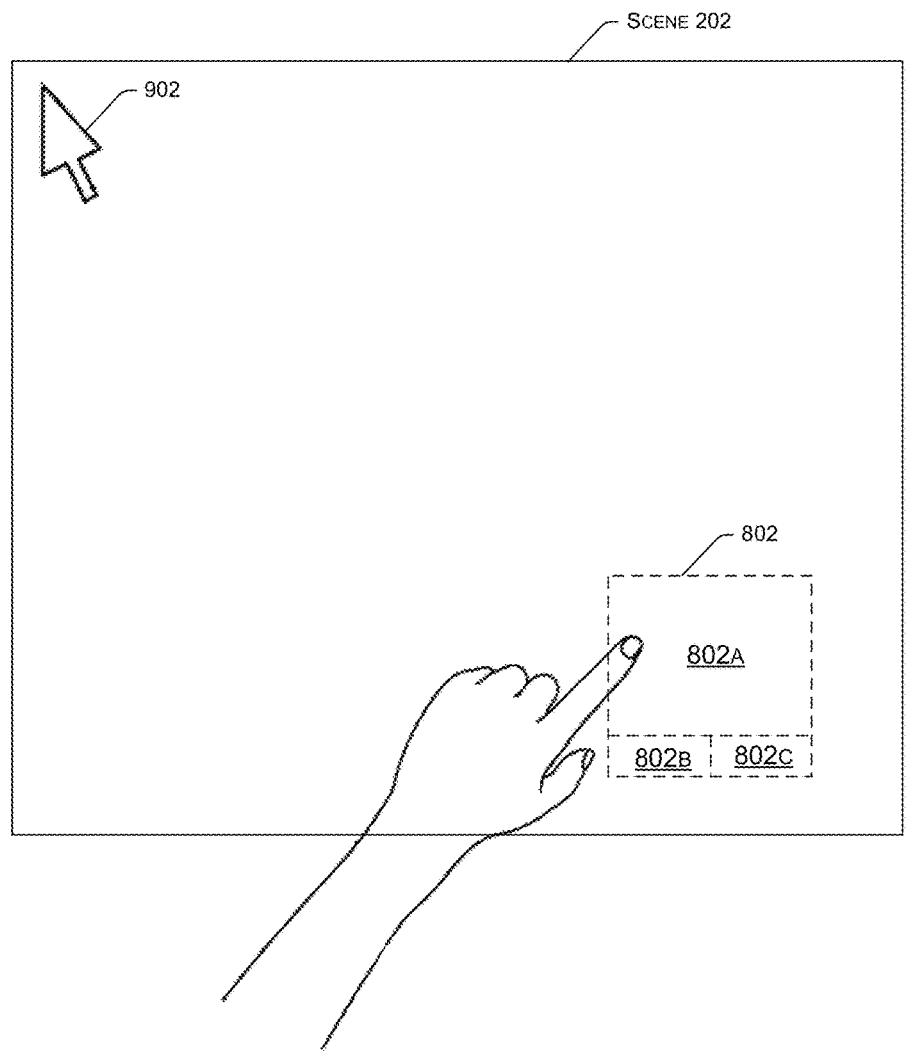
FIG. 11 illustrates defining various areas of a virtual trackpad.

In some implementations, in addition to defining the virtual trackpad 802, the person 402 may also define a left button and a right button of the virtual trackpad 802. For example, as illustrated in FIG. 11, while defining the virtual trackpad 802, the person 402 may use appropriate pre-defined hand gestures to define three areas of the virtual trackpad 802—areas 802A, 802B and 802C. While using the virtual trackpad 802, the person 402 may navigate the finger across the area 802A to correspondingly move the mouse cursor 902. The areas 802B and 802C may respectively act as the left button and the right button of the virtual trackpad 802. For example, after moving the mouse cursor 902 in an appropriate location using the area 802A, the person 402 may tap a finger into the area 802B to activate a left click of the mouse, and may tap the finger into the area 802C to activate a right click of the mouse. In some implementations, the projector 106 may project the boundaries of the areas 802A-802C of the virtual trackpad 802 onto the scene 202, to enable the person 402 to readily identify and use the virtual trackpad 802.

In some implementations, a part of the scene 202 may be projected, for example, in a wall, and another part of the scene 202 may be projected in a table. The person 402 may define the virtual trackpad 802 onto a part of the scene 202 that may be readily physically accessible to the person 402 (e.g., may define the virtual trackpad 802 onto a part of the scene 202 that is projected on the table). In some implementations, using predefined hand gestures, the person 402 may drag an already generated virtual trackpad 802 from a first location of the scene 202 to a second location of the scene 202.

In some implementations, the person 402 may delete or erase the virtual trackpad 802 by, for example, using a pre-defined gesture, selecting an appropriate menu option, and/or using an appropriate voice command.

In some implementations, multiple virtual trackpads may be generated by the person 402 (or by multiple persons) in various convenient locations, such that the person 402 can control the mouse cursor 902 from any one of these virtual trackpads. In some implementations, each of the multiple virtual trackpads may control a corresponding mouse cursor.

Although FIGS. 8A, 8B, 9A and 9B illustrates generation and usage of the virtual trackpad 802 using gestures, in some implementations, other types of virtual input devices may also be generated using predefined gestures. For example, using predefined hand gestures (e.g., accompanied by appropriate voice commands), the person 402 may generate virtual slider bars, virtual remote controllers, and/or virtual on/off switches to control operations of various devices.

As an example, the person 402 may generate a virtual slider bar using a predefined hand gesture. Once the virtual slider bar is generated, the person 402 may select (e.g., using a menu option and/or a voice command) a device to be controlled by the generated virtual slider bar. For example, once the virtual slider bar is generated, the ARFN 102 may provide the person 402 with a list of devices that can be controlled by the virtual slider bar. The person 402 may select a device (e.g., a heating unit communicatively coupled to the ARFN 102), and subsequently control the device (e.g., control the temperature of the heating unit) using the virtual slider bar.

In another example, the person 402 may select a device from a list of devices, and then generate a virtual slider bar using gestures to control the selected device.

In some implementations, the person 402 may define a physical object to act as a virtual input device. For example, the person 402 may use predefined hand gestures to identify a paper weight (e.g., by drawing circles with three fingers around the paper weight, by tapping on the paper weight, by tapping the paper weight on a surface, by pointing towards the paper weight, etc.). Once identified, the person 402 may define the paper weight to act as an appropriate virtual input device. For example, the person 402 may define the paper weight to act as a mouse using appropriate predefined hand gestures. Subsequently, moving the paper weight around in the scene 202 may be interpreted by the ARFN 102 as a movement of a mouse (i.e., the mouse cursor 902 may be moved corresponding to the movement of the paper weight). Thus, the paper weight may act as a virtual input device. In an example, the paper weight may be moved inside the virtual trackpad 802, to correspondingly move the mouse cursor 902 in the scene 202. In an example, a tap on the paper weight and/or a tap by the paper weight on a surface may be interpreted as being clicking a representation of a mouse button. In another example, the physical object may also be used to drag the scene 202 to a different position, change an orientation of the scene 202, and/or the like. For example, by moving and/or rotating the physical object (e.g., accompanied by other appropriate gestures using the physical object or voice commands), the person 402 may facilitate dragging the scene 202, rotating the scene 202, and/or the like. In yet another example, an interaction by the person 402 with the physical object is detected (e.g., the interaction may comprise tapping the physical object, moving the physical object in a predefined manner, etc.). Based on detecting the interaction with the physical object, an action is performed, where the action comprises one of moving a mouse cursor, clicking a representation of a mouse button, selecting an object that is displayed onto the scene 202, dragging the object, deleting the object drag, starting and/or stopping playing of an audio file, and/or the like.

Although a specific example of a paper weight being defined as a mouse is discussed, in other implementations, any other appropriate physical objects (e.g., a pen, a bottle, etc.) may be defined as any appropriate virtual input device (e.g., a virtual slider bar, a virtual on/off switch, etc.).

In some implementations, the person 402 may select a virtual input device from a catalog of virtual input devices. For example, using an appropriate interface (e.g., hand gestures, voice commands, a physical or a virtual interface, and/or the like), the person 402 may browse through a catalog of virtual input devices. The catalog may list, for example, a virtual trackpad, a virtual slider bar, a virtual key board, and/or other appropriate virtual input devices. The person 402 may select a virtual input device from the catalog and use the selected virtual input device through predefined gestures. For example, the person 402 may select the virtual trackpad from the catalog. Once the virtual trackpad is selected, the ARFN 102 may confirm the selection (e.g., through an audio announcement, a message projected onto the scene 202, and/or the like), and/or project an outline of the virtual trackpad onto the scene 202. The person 402 may drag the virtual trackpad to a location of the scene 202 that is readily accessible to the person 402, configure the virtual trackpad (e.g., using options projected onto the scene 202) and use the virtual trackpad through appropriate hand gestures.

The catalog of virtual input devices may enable the person 402 to readily use a virtual input device, without having to generate the virtual input device. In some implementations, the person 402 may add new virtual input devices in the catalog, delete virtual input devices from the catalog, modify a virtual input device in the catalog (e.g., configure various options and properties of a virtual input device by, for example, redefining a border of a virtual trackpad), and/or otherwise configure the catalog. For example, upon generating the virtual trackpad 802 of FIG. 2, the person 402 may save the virtual trackpad 802 in the catalog of virtual input devices.

In an implementation, a virtual input device may be customized based on a user using the virtual input device. For example, for a user with a relatively small hand, the virtual input device may be customized accordingly (e.g., the virtual input device may be configured to identify gestures of the relatively small hand and move a mouse cursor accordingly). In another example, for an aged user whose hand trembles involuntarily, the virtual input device may be customized accordingly (e.g., such involuntarily trembling may be filtered out while detecting gestures of the hand). In an implementation, subsequent to generating the virtual input device and during a training period, the system may be customized to correctly recognize hand gestures while the user interacts with the virtual input device.

In an implementation, access control may be used to selectively provide access to one or more users to generate, customize and/or to use a virtual input device. For example, a first group of users may be authorized to generate a virtual input device, and a user outside the first group may not be able to generate the virtual input device. Similarly, a second group of users may be authorized to use a virtual input device, and a user outside the second group may not be able to use the virtual input device. For example, a virtual input device may be used as a remote control to control temperature of a house. While the owner of the house (or an adult living in the house) may be authorized to generate, customize and/or use the virtual input device to set the temperature of the house, a guest (or a child) may not be authorized to do so.

In an implementation, a virtual input device may be generated to control a corresponding device. For example, a first virtual input device may be generated to control a television, a second virtual input device may be generated to control a temperature of a room, and a third virtual input device may be generated to an audio player. Each of the generated virtual input devices can be configured such that it can appropriately control the corresponding device. For example, the first virtual input device may be configured to change display attributes and volume of the television, the second virtual input device may be configured to set the temperature of the room, and the third virtual input device may be configured to control a volume and treble of the audio player.

Figure 12:
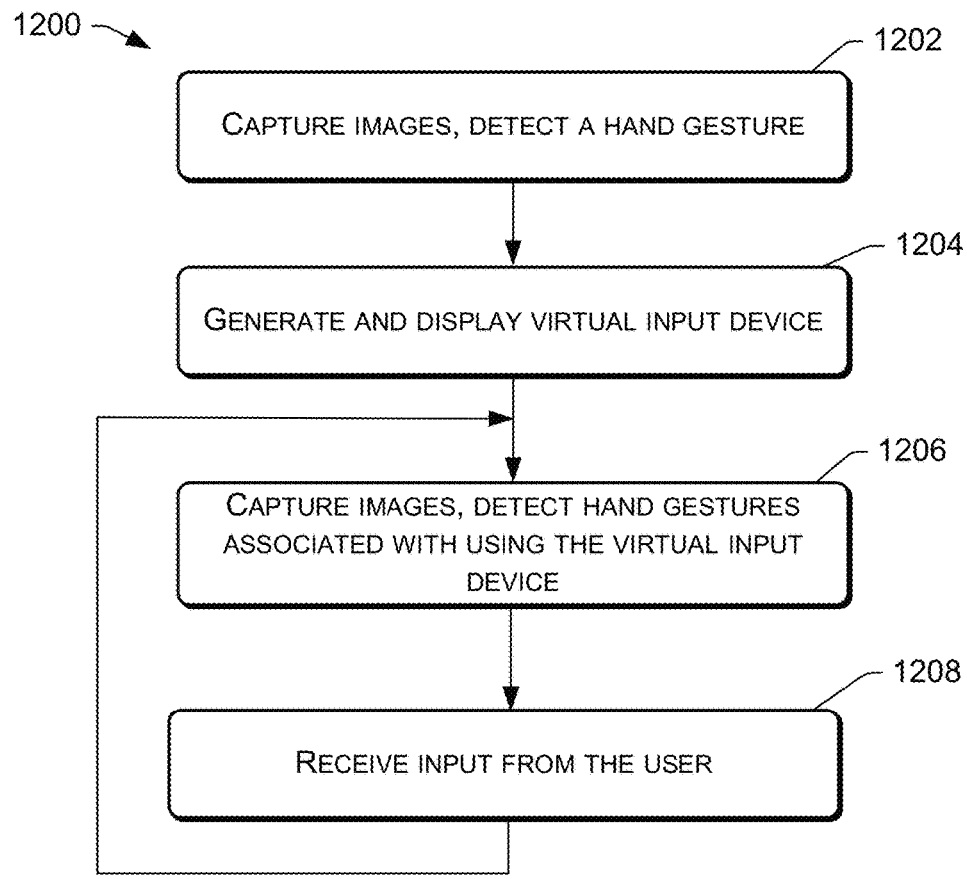
FIG. 12 illustrates an example flow diagram of generation and use of a virtual input device using gestures.

FIG. 12 illustrates an example method 1200 of generation and use of a virtual input device using gestures. An action 1202 comprises capturing one or more images of the scene 202, including those parts or regions of the scene 202 that may contain the hand 404. In the described embodiment, the one or more images may be 2D images captured by the camera 108. The one or more images may also include other data objects, such as images containing 3D information corresponding to the scene 202. For example, certain captured images may show a reflected light pattern, based on a structured light pattern that is projected by the projector 106. 3D information or characteristics regarding the scene may be obtained by analyzing the reflected light pattern.

Alternatively, or in addition, the captured images may include images of the scene 202 taken from different perspectives, which may be analyzed in comparison to each other to reconstruct 3D characteristics of the scene 202.

The action 1202 may also comprise detecting a hand gesture in the captures images. For example, in the captures images, sequential poses of a hand of a user may be detected. The hand gesture may be compared to a plurality of reference hand gestures. Based on a match of the hand gesture with a reference hand gesture (e.g., if the hand gesture matches with the reference hand gesture beyond a threshold value), it may be determined that the hand gesture defines a virtual input device.

An action 1204 may comprise generating a virtual input device and displaying the generated virtual input device. For example, based on detecting the hand gesture at action 1202 (e.g., based on the detected hand gesture matching a reference hand gesture), the virtual input device may be generated and displayed onto a part of the scene 202.

An action 1206 may comprise further capturing images, and detecting hand gestures associated with using the generated virtual input device. For example, if the generated virtual input device is a virtual trackpad, the hand gestures detected at action 1206 may comprise moving a finger of the hand within a boundary of the virtual trackpad.

An action 1208 may comprise receiving input from the user via the virtual input device. For example, at action 1206, it may be detected that the user is moving the finger of the hand within the boundary of the virtual trackpad. Accordingly, receiving an input from the user at action 1208 may comprise receiving an input to move a projection of a mouse cursor correspondingly onto the scene 202. The actions 1206 and 1208 may be repeated, for example, as long as the user uses the generated virtual input device.

CONCLUSION

The described hand pose detection techniques may be used by the ARFN 102 or another system to evaluate motions and hand gestures of a person, and to receive instructions or commands from a person. These or similar techniques may be used in conjunction many different types of devices, such general-purpose computers, game systems, industrial systems, and so forth.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   an imaging sensor;
   a projector; and
   one or more computer-readable media storing computer-executable instructions that, when executed by the one or more processors, cause the one or more processors to perform acts comprising:
   projecting content onto a display area within an environment using the projector;
   capturing a sequence of images of the environment using the imaging sensor;
   based at least in part on the sequence of images, detecting sequential poses of a hand of a user within the sequence of images;
   based at least in part on detecting the sequential poses of the hand of the user, determining that a first gesture of the hand interacts with a physical object different from the user;
   determining a first identity of the user;
   determining, based at least in part on the first identity of the user, that the user is included within a group of users that are authorized to at least one of generate, customize, or access a virtual input device;
   defining the physical object as the virtual input device to receive input from the user at a time in which the user further interacts with the physical object;
   determining a second gesture of the hand based at least in part on the user interacting with the physical object;
   performing an action based at least in part on the second gesture;
   determining a third gesture with respect to the physical object;
   determining a second identity of a second user associated with the third gesture;
   determining, based at least in part on the second identity of the second user, that the second user is not included within the group of users; and
   refraining from performing a second action associated with the third gesture based at least in part on the second user not being included within the group of users.

2. The system of claim 1, wherein:
   determining the first gesture comprises identifying movement of a number of fingers of the hand; and
   the movement of the number of fingers of the hand defines the boundary of the virtual input device.

3. The system of claim 2, wherein:
   determining the second gesture of the hand comprises identifying movement of another number of fingers of the hand within the boundary of the virtual input device; and
   performing the action comprises moving a proj ection of a cursor within the display area based at least in part on the movement of the another number of fingers of the hand within the boundary of the virtual input device.

4. The system of claim 1, wherein:
   determining the second gesture of the hand comprises determining a tapping by the user within the boundary of the virtual input device; and
   performing the action comprises selecting a representation of a mouse button of the virtual input device.

5. The system of claim 1, wherein performing the action comprises at least one of moving a cursor associated with the virtual input device, selecting a representation of a left mouse button of the virtual input device, selecting a representation of a right mouse button of the virtual input device, or scrolling a representation of a mouse wheel of the virtual input device.

6. The system of claim 1, wherein:
   determining the first gesture of the hand further comprises identifying a first area and a second area within the boundary of the virtual input device, wherein the first area is associated with a left mouse button of the virtual input device, and wherein the second area is associated with a right mouse button of the virtual input device; and displaying the virtual input device further comprises displaying the first area and the second area.

7. The system of claim 1, the acts further comprising:
associating the virtual input device with the display area on which the content is projected, such that a movement of at least a portion of the hand within the boundary of the virtual input device causes a corresponding movement of a projection of a cursor within the display area.

8. The system of claim 1, wherein displaying the virtual input device further comprises:
illuminating the boundary of the virtual input device.

9. The system of claim 1, wherein the sequential poses of the hand indicate position and orientation of the hand relative to at least three dimensions.

10. One or more non-transitory computer-readable media storing computer-executable instructions that, when executed by one or more processors, cause the one or more processors to perform acts comprising:
capturing images of an environment;
determining an estimated motion parameter associated with a first gesture of a user that is depicted in at least one image of the images;
determining that the estimated motion parameter associated with the first gesture matches a motion parameter associated with a predefined gesture;
based at least in part on determining that the estimated motion parameter associated with the first gesture matches the motion parameter associated with the predefined gesture, displaying a virtual input device;
determining a first identity of the user;
determining, based at least in part on the first identity of the user, that the user is included within a group of users that are authorized to at least one of generate, customize, or access the virtual input device;
causing a first action to be performed based at least in part on at least one of the first gesture or a second gesture of the user;
determining a third gesture with respect to the virtual input device;
determining a second identity of a second user associated with the third gesture;
determining, based at least in part on the second identity of the second user, that the second user is not included within the group of users; and
refraining from performing a second action associated with the third gesture based at least in part on the second user not being included within the group of users.

11. The one or more non-transitory computer-readable media of claim 10, wherein displaying the virtual input device further comprises:
comparing the first gesture with a plurality of predefined gestures that includes the predefined gesture; and
determining that the first gesture matches the predefined gesture by determining that a match between the first gesture and the predefined gesture meets or exceeds a threshold value.

12. The one or more non-transitory computer-readable media of claim 10, wherein the instructions cause the one or more processors to further perform acts comprising:
at least partly subsequent to displaying the virtual input device, receiving input from the user via the virtual input device.

13. The one or more non-transitory computer-readable media of claim 12, wherein receiving the input further comprises:

determining the second gesture based at least in part on an interaction of the user with the virtual input device; and
based at least in part on the second gesture, receiving the input from the user.

14. The one or more non-transitory computer-readable media of claim 10, wherein the instructions cause the one or more processors to further perform acts comprising:
at least partly subsequent to displaying the virtual input device, determining the second gesture based at least in part on an interaction of the user with the virtual input device; and
based at least in part on the second gesture, configuring a parameter of the virtual input device.

15. The one or more non-transitory computer-readable media of claim 10, wherein displaying the virtual input device further comprises:
defining a boundary of the virtual input device based at least in part on the first gesture; and
displaying the boundary of the virtual input device.

16. The one or more non-transitory computer-readable media of claim 10, wherein displaying the virtual input device further comprises:
projecting light to illuminate a boundary of the virtual input device on a display area.

17. The one or more non-transitory computer-readable media of claim 10, wherein the virtual input device comprises a representation of one of a virtual trackpad, a virtual slider bar, or a virtual remote control.

18. A method comprising:
determining that a first hand gesture of a user interacts with a physical object different from the user;
based at least in part on determining that the first hand gesture interacts with the physical object, defining the physical object as a virtual input device to receive input from the user at a time in which the user further interacts with the physical object;
determining a first identity of the user;
determining, based at least in part on the first identity of the user, that the user is included within a group of users that are authorized to at least one of generate, customize, or access the virtual input device;
causing a first action to be performed based at least in part on at least one of the first gesture or a second gesture of the user;
determining a third gesture of a second user;
determining a second identity of the second user;
determining, based at least in part on the second identity of the second user, that the second user is not included within the group of users; and
refraining from performing a second action associated with the third gesture based at least in part on the second user not being included within the group of users.

19. The method of claim 18, further comprising:
at least partly subsequent to defining the physical object as the virtual input device, tracking a movement of the physical object as the user moves the physical object; and
at least partly in response to tracking the movement of the physical object, correspondingly moving a projection of a cursor within a display area.

20. The method of claim 18, further comprising:
at least partly subsequent to defining the physical object as the virtual input device, identifying a tapping by the user on or using the physical object; and
interpreting the tapping by the user as a selection of a representation of a button of the virtual input device.

21. The method of claim 18, further comprising:
at least partly subsequent to defining the physical object as the virtual input device, detecting a first interaction by the user with the physical object; and
based at least in part on detecting the first interaction by the user with the physical object, performing the first action.

22. The method of claim 18, wherein the first hand gesture comprises one of drawing a circle around the physical object, tapping the physical object, or pointing towards the physical object.

23. The method of claim 18, wherein the physical object is not a physical input device for receiving input from the user.

24. The method of claim 18, wherein determining the first hand gesture of the user further comprises:
capturing images of sequential poses of the hand of the user; and
based at least in part on capturing the images, determining the first hand gesture of the user.

25. The method of claim 18, wherein the virtual input device is one of a virtual pointing device, a virtual trackpad, a virtual mouse, or a virtual slider bar.

26. One or more non-transitory computer-readable media storing computer-executable instructions that, when executed by one or more processors, cause the one or more processors to perform acts comprising:
capturing images of an environment;
based at least in part on the images, determining that a first gesture of a user matches a predefined gesture;
based at least in part on determining that the first gesture matches the predefined gesture, selecting a virtual input device from a catalog of virtual input devices;
determining a first identity of the user;
determining, based at least in part on the first identity of the user, that the user is included within a group of users that are authorized to at least one of generate, customize, or access the virtual input device;
causing a first action to be performed based at least in part on at least one of the first gesture or a second gesture of the user;
determining a third gesture of a second user;
determining a second identity of the second user;
determining, based at least in part on the second identity of the second user, that the second user is not included within the group of users; and
refraining from performing a second action associated with the third gesture based at least in part on the second user not being included within the group of users.

27. The one or more non-transitory computer-readable media of claim 26, wherein the facilitating further comprises:
determining the second gesture of the user from a set of gestures; and
based at least in part on determining the second gesture, receiving input from the user via the virtual input device.

28. The one or more non-transitory computer-readable media of claim 26, wherein a set of gestures comprise a first set of gestures, and wherein the instructions cause the one or more processors to further perform acts comprising:
facilitating the user to configure the virtual input device through a second set of gestures; and
facilitating the user to save the virtual input device in the catalog of virtual input devices.

29. The one or more non-transitory computer-readable media of claim 26, wherein the instructions cause the one or more processors to further perform acts comprising:
based at least in part on the images, determining the second gesture of the user;
based at least in part on the second gesture, generating a second virtual input device; and
facilitating the user to save the second virtual input device in the catalog of virtual input devices.

* * * * *